Sept. 21, 1954       H. PETRI                2,689,546
                  MILKING STRUCTURE
Filed April 11, 1952                    2 Sheets-Sheet 2
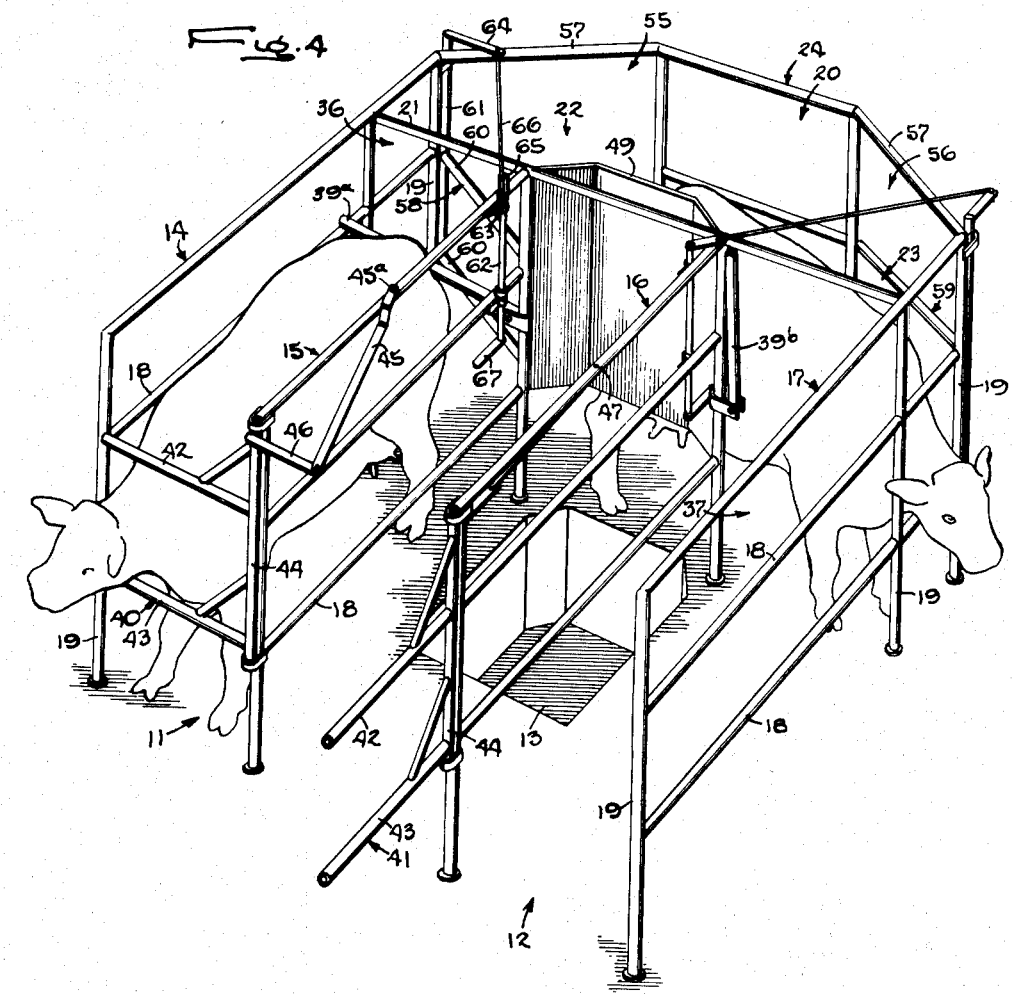
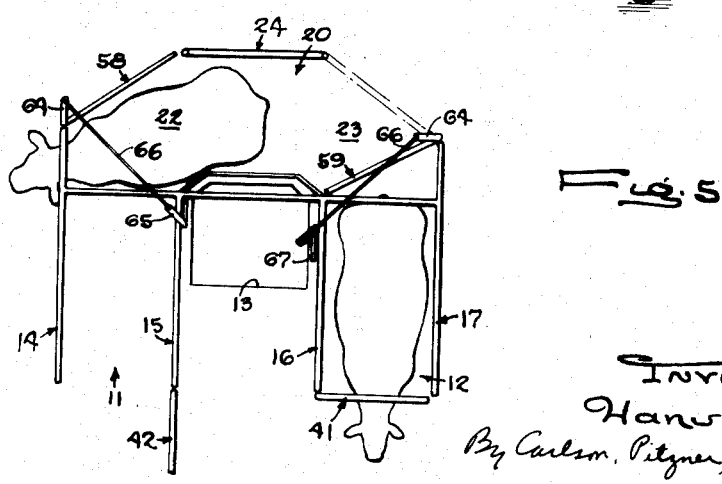

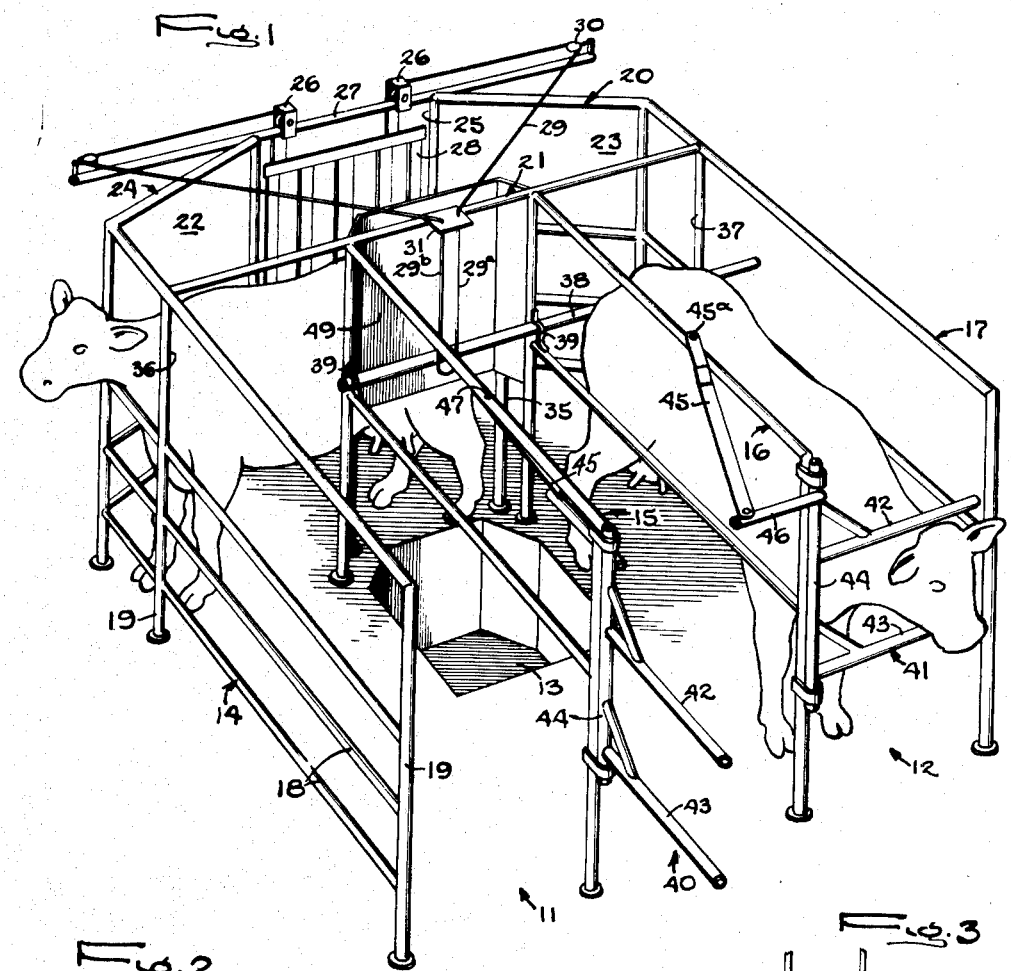

Patented Sept. 21, 1954

2,689,546

UNITED STATES PATENT OFFICE 2,689,546

MILKING STRUCTURE

Hans Petri, Lena, Ill.

Application April 11, 1952, Serial No. 281,825

13 Claims. (Cl. 119—14.03)

This invention relates to a milking structure, or parlor, in which both the washing of a cow's udder and the milking are performed.

The general object of the invention is to provide a new and improved milking structure in which a single operator working in a small area, as compared to prior milking structures of the above character, can simultaneously handle a plurality of cows and by which the cow is moved naturally into successive washing and milking positions.

A more detailed object is to provide a structure of the above character in which an operator can wash the udder of a cow while two other cows are being milked and yet in which the udders of all the cows are readily accessible to a common work area so that the operator is required to take comparatively few steps in attending the various cows and the need for elaborate piping to convey milk from remote milking stations is eliminated.

The invention also resides in a novel gate and barrier structure which holds the cows in position during the washing and milking operations.

Other objects and advantages of the invention will become apparent from the following detailed description taken in connection with the accompanying drawings, in which Figure 1 is a perspective view of a milking structure embodying the novel features of the present invention.

Fig. 2 is a schematic plan view on a reduced scale of the milking structure shown in Fig. 1.

Fig. 3 is a schematic plan view of a modified form of the invention.

Fig. 4 is a perspective view of another modification of the invention.

Fig. 5 is a schematic plan view on a reduced scale of the milking structure shown in Fig. 4.

For the purpose of illustrating the invention, Figs. 1 and 2 show a pair of milking stalls 11 and 12 disposed parallel to each other and spaced apart to provide a work area 13 between them, the work area being shown herein as a pit so the operator is not required to stoop when attending the cows. To permit access to the stalls 11 and 12 from the sides thereof, the walls 14, 15, 16 and 17 may be conveniently made as an open framework of cross bars 18 extending between upright members 19. Since each milking stall is substantially the same length as a cow standing therein, an operator in the work area 13 may reach through the inner walls 15 and 16 to attach the teat cups of a milking machine (not shown) to the udder of the cow.

Before the milking operation is begun, it is necessary to wash the udder of each cow and, for this purpose, a washing stall 20 is positioned across the adjacent ends of the milking stalls 11 and 12, thus forming a generally U-shaped structure. The washing stall 20 is approximately one and one-half times the length of a cow so that the udder of a cow standing with its head projecting through either end of the washing stall 20 will be located adjacent the work area 13 from which the operator can perform the washing operation by reaching through the open framework forming the wall 21 of the washing stall. Thus, in effect, the washing stall 20 comprises two washing compartments or spaces 22 and 23 overlapping each other at their inner ends adjacent the work area 13, each compartment being substantially equal in length to the width of the space between the milking stalls plus the width of one milking stall. It will be apparent that, with the above arrangement of the washing compartments 22 and 23 and the milking stalls 11 and 12 a cow standing at any position in the milking structure will have its udder next to the comparatively small work area 13 within the U. The washing stall and, if desired, the milking stalls may be provided with a suitable drain or gutter (not shown) to remove the water used in washing the cow's udder and in cleaning the stalls.

To admit a cow to either of the washing compartments 22 and 23, the outside wall 24 of the washing stall 20 is formed with an opening 25 in the center thereof where the compartments overlap. The wall 24 of the washing stall 20 diverges away from the opening 25 so that the cows do not have to make a right-angle turn as they enter the compartments 22 and 23. A pair of trolleys 26 rolling on a track 27 carry a gate 28 to open and close the opening 25. To operate the gate 28 from the work area 13, each end of a flexible line or rope 29 is fastened to one of the trolleys 26 from which it extends along the track 27, around a pulley 30, and through a guide 31 mounted on the inner wall 21 of the washing stall 20 to the work area 13. Thus, by pulling downwardly on the opposite downwardly hanging portions 29ª and 29ᵇ of the rope 29, the gate 28 may be slid back and forth to open and close the opening 25.

A cow is held in each of the washing compartments 22 and 23 with its head at the outer end thereof by a pair of barriers 32 and 33 (Fig. 2) which block off the inner ends of the compartments. Herein, each of the barriers 32 and 33 comprises a horizontal arm 34 mounted on the upper end of an upright shaft 35 which is suitably journeled in the floor of the milking structure, thus swinging the arm 34 across the washing stall 20 to define the inner end of each compartment 22 and 23. In addition to holding a cow in the washing compartments, the barriers 32 and 33 also serve to direct the cow into the proper compartment. Thus, with the barrier 32 swung across the washing stall 20 as shown in Fig. 2, a cow entering through the opening 25 naturally walks into the compartment 23 and stops in a position with its head projecting outwardly across the end of the milking stall 12.

In order that a cow may move to the milking stalls 11 and 12 after the washing operation, the tail ends of the milking stalls communicate with the outer ends of the adjacent washing compartments 22 and 23 through openings 36 and 37. To prevent a cow from prematurely entering the milking stalls 11 and 12 and from backing out when once in these stalls, another barrier 38 closes the openings 36 and 37. This barrier may be a single bar (Fig. 1 and 2) sliding in brackets 39 back and forth across the openings 36 and 37, the bar being long enough to close both openings at the same time if so desired, or separate barriers for each opening may be used such as the bars 39ª and 39ᵇ (Fig. 4) pivoted on the inner walls of the milking stalls 11 and 12 to swing down across the tail ends of these stalls.

During the milking operation, the cow is held in the milking stalls 11 and 12 by a pair of gates 40 and 41 at the head end of these each of which gates comprises two cross members 42 and 43 vertically spaced apart to permit the cow's head to project in between the bars and outwardly from the end of the milking compartment. Each pair of cross members 42 and 43 is secured to a support 44 which is pivoted to one of the inner walls 15 and 16 to swing the cross members, thus opening and closing the head end of the stalls 11 and 12. Each of the gates 40 and 41 is operated from the work area 13 by pushing and pulling a handle 45 pivoted at one end to an arm 46 which, in turn, is rigid with the support 44. The gates may be secured in their closed position in any convenient manner, such as by inserting a pin 45ª on the handle 45 into an aperture 47 formed in the inner walls 15 and 16.

With the milking structure as described above, all of the necessary equipment such as the washing utensils and the teat cups are in the work area 13 where they are readily available for use by the operator as he attends the cows being washed and milked. The milk drawn into the teat cups flows directly to the milk cans 48, thus eliminating the need for extensive piping which would require frequent cleaning. So that the cows do not become frightened by the sight of the equipment in the work area 13 as they enter through the opening 25, a shield 49 is placed on the upper portion of the inside wall 21 of the washing stall 20 and blocks the work area 13 from the cow's view.

Instead of constructing the washing stall 20 with gradually converging and overlapping compartments 22 and 23 as shown in Figs. 1 and 2, the milking structure may include a washing stall 20' with more sharply converging washing compartments 22' and 23' as illustrated in Fig. 3. Since a cow in either of the compartments 22' and 23' does not obstruct the entrance through the opening 25' to the other compartment, two cows may simultaneously be in position to be washed. In this case, a single barrier 50 pivotally mounted at the intersection of the inside walls 51 and 52 of the compartments 22' and 23' is swung back and forth across the inner ends of the compartments to direct a cow to the desired washing position. The barriers 53 and 54 separating the milking stalls 11 and 12 from the washing compartments 22' and 23' here may be similar to the gates 40 and 41 to permit a cow to project its head therethrough while being washed.

In the modified construction shown in Figs. 4 and 5, the washing stall 20 is provided with two openings 55 and 56, one adjacent each end of the stall, so that the cows may walk into the washing compartments 22 and 23 without turning as they enter. For this purpose, the openings are formed at the inner ends of the compartments in the diverging portions 57 of the outer washing stall wall 24 and are closed respectively by gates 58 and 59. The gate 58 comprises horizontal cross bars 60 fast on a vertical bar 61 which is pivotally mounted on one of the upright members 19 at the end of the washing stall to swing the cross bars in across the tail end of the adjacent milking stall 11. In order that the gate 58 may be operated from the work area 13, a vertical rod 62 journaled in brackets 63 on the inner wall 15 is connected to the gate by crank arms 64 and 65 fast on the upper ends of the bar 61 and the rod 62 respectively and joined by a connecting rod 66 whereby the gate is swung open and closed when the rod 62 is turned back and forth by turning a handle 67 secured to the lower end of the rod. The other gate 59 is of the same construction and is opened and closed by a similar mechanism.

In using a milking structure as first described above, the barrier 32 for example is swung across the washing stall 20 to define the inner end of the compartment 23 to be used as the next washing compartment. At the same time, the barrier 38 is slid across the tail end of the milking stall 12 as shown in Fig. 2, and the rope 29 is pulled to open the gate 28 and admit a cow to the compartment 23 where, after the gate 28 is again closed, the cow stands while its udder is being washed. The barrier 38 is next shifted to allow the cow to walk through the opening 37 into the milking stall 12 and then closed to prevent the cow from backing out. After the operator has attached the teat cups to the first cow, the barrier 32 is swung in and the barrier 33 is positioned across the washing stall 20 to direct the second cow into the other compartment 22 for washing. The barrier 38 is then shifted to the position shown in Fig. 1 to admit the second cow to the milking stall 11, and, while both the first and second cows are being milked, a third cow is washed in the compartment 23. When the milking of the first cow has been completed the operator pulls the handle 45 swinging open the gate 41 and slides the barrier 38 to the left as viewed in Fig. 1. The first cow then leaves the milking stall 12 and its place is taken by the third cow.

The operation of the modification shown in Fig. 3 is the same except that cows may be admitted to both of the stalls 22' and 23' simultaneously and washed so as to be ready to enter whichever of the milking stalls 11 and 12 is empty first.

In operating the milking structure shown in Figs. 4 and 5, the gate 58, for example, may be opened and a cow walks straight through the opening 55 and into the compartment 23, the gate in its open position serving to guide the cow as she enters and to prevent her from turning into the milking stall 11. The gate 58 may then be closed and the cow washed after which the barrier 39b is raised to permit the cow to enter the milking stall 12. After the barrier 39b has been returned to its former position across the tail end of the milking stall 12 and the teat cups have been attached to the first cow, the gate 59 is swung open and a second cow enters the washing compartment 22 through the opening 56. The second cow next is admitted to the milking stall 11 and then the operation continues as in the case of the arrangement shown in Figs. 1 and 2.

It will be apparent that in using a U-shape milking structure according to the present invention, the work area 13 is comparatively small and yet is readily accessible to the udder of a cow standing in any of the two washing or two milking positions. Since the operator need only turn from one cow to the next, no time is lost walking back and forth, thus increasing the number of cows which a single operator may serve at one time.

This application is a continuation-in-part of my application, Serial No. 246,755, filed September 15, 1951, now abandoned.

I claim as my invention:

1. In a milking structure, the combination of, a pair of milking stalls laterally spaced apart with a work area between them, each of said stalls being substantially the same length as a cow's body, and a washing stall spanning adjacent ends of said milking stalls and having opposite end portions overlapping and communicating with said milking stalls and an intermediate portion extending across said work area, one of said end portions and said intermediate portion defining a first space substantially the length of a cow's body and the other end portion and the intermediate portion defining a second and similar space, said washing stall including means to admit a cow to either of said spaces with its head at the corresponding end of the washing stall.

2. In a milking structure, the combination of, a pair of milking stalls arranged generally parallel to each other and spaced apart to define a work area between them, each of said stalls being substantially the same length as a cow's body and having a head end and a tail end, the head ends of said stalls facing in the same directions, and a washing stall spanning and extending across the tail ends of said milking stalls and having opposite end portions overlapping said milking stalls and an intermediate portion extending across said work area thereby to form a generally U-shaped structure with said work area within the U, said end portions communicating with said tail ends and the combined length of one of said end portions and said intermediate portion being substantially the length of a cow's body to dispose the udder of a cow adjacent said area and at the closed end of said U irrespective of the direction in which the cow is facing while standing in said washing stall, said washing stall including means to admit a cow with its head at either end thereof.

3. In a milking structure, the combination of, a pair of milking stalls laterally spaced apart with a work area between them, each of said stalls being substantially the same length as a cow's body, and a washing stall spanning adjacent ends of said milking stalls and having opposite end portions overlapping and communicating with said milking stalls and an intermediate portion extending across said work area, one of said end portions and said intermediate portion defining a first space substantially the length of a cow's body and the other end portion and the intermediate portion defining a second and similar space, said washing stall having an admission opening in said intermediate portion in the side opposite said work area to admit a cow to either of said spaces with its head at the corresponding end of the washing stall.

4. In a milking structure, the combination of, a pair of milking stalls arranged generally parallel to each other and spaced apart to define a work area between them, each of said stalls being substantially the same length as a cow's body and having a head end and a tail end, the head ends of said stalls facing in the same direction, a washing stall spanning and extending across the tail ends of said milking stalls and having opposite end portions overlapping said milking stalls and an intermediate portion extending across said work area thereby to form a generally U-shaped structure with said work area within the U, said end portions communicating with said tail ends and the combined length of one of said end portions and said intermediate portion being substantially the length of a cow's body to dispose the udder of a cow adjacent said area and at the closed end of said U irrespective of the direction in which the cow is facing while standing in said washing stall, said stall including means to admit a cow with its head at either end thereof, a barrier for each of said milking stalls separating the tail end thereof from said washing stall and operable selectively to maintain a cow in said washing stall and to admit a cow which has been washed from said washing stall to the corresponding milking stall, and a gate at the head end of each of said milking stalls to permit a cow therein to leave the latter upon completion of the milking operation.

5. In a milking structure, the combination of, a pair of milking stalls arranged generally parallel to each other and spaced apart to define a work area between them, each of said stalls being substantially the same length as a cow's body and having a head end and a tail end, the head ends of said stalls facing in the same direction, a washing stall spanning and extending across the tail ends of said milking stalls and having opposite end portions overlapping said milking stalls and an intermediate portion extending across said work area thereby to form a generally U-shaped structure with said work area within the U, said end portions communicating with said tail ends and the combined length of one of said end portions and said intermediate portion being substantially the length of a cow's body to dispose the udder of a cow adjacent said area and at the closed end of said U irrespective of the direction in which the cow is facing while standing in said washing stall, said washing stall including means to admit a cow with its head at either end thereof, and a gate at the head end of each of said milking stalls to permit a cow therein to leave the latter upon completion of the milking operation.

6. In a milking structure, the combination of, a pair of milking stalls laterally spaced apart with a work area between them, each of said stalls being substantially the same length as a cow's body, a washing stall spanning adjacent ends of said milking stalls and having opposite end portions overlapping and communicating with said milking stalls and an intermediate portion extending across said work area, one of said end portions and said intermediate portion defining a first space substantially the length of a cow's body and the other end portion and the intermediate portion defining a second and similar space, said washing stall having an admission opening in said intermediate portion in the side opposite said work area to admit a cow to either of said spaces with its head at the corresponding end of the washing stall, and a solid shield on the other side of said washing stall along said intermediate portion to block said work area from the view of a cow entering the washing stall through said opening.

7. In a milking structure, the combination of, a pair of milking stalls laterally spaced apart with a work area between them, each of said stalls being substantially the same length as a cow's body, a washing stall spanning adjacent ends of said milking stalls and having opposite end portions overlapping and communicating with said milking stalls and an intermediate portion extending across said work area, one of said end portions and said intermediate portion defining a first space substantially the length of a cow's body and the other end portion and the intermediate portion defining a second and similar space, said washing stall including means to admit a cow to either of said spaces with its head at the corresponding end of the washing stall, a barrier for each of said milking stalls separating the latter from the adjacent space and operable selectively to maintain a cow in said space and admit a cow which has been washed to said stall, and second barriers operable to separate said intermediate portion from said end portions and selectively define the inner ends of said spaces.

8. In a milking structure, the combination of, a pair of milking stalls laterally spaced apart with a work area between them, each of said stalls being substantially the same length as a cow's body, and a washing stall spanning adjacent ends of said milking stalls and having opposite end portions overlapping and communicating with said milking stalls and an intermediate portion extending across said work area, one of said end portions and said intermediate portion defining a first space substantially the length of a cow's body and the other end portion and the intermediate portion defining a second and similar space, said washing stall having an admission opening to admit a cow thereto, a gate closing said opening, and means connected to said gate and operable from said work area to open and close the gate.

9. In a milking structure, the combination of, a pair of milking stalls arranged generally parallel to each other and spaced apart to define a work area between them, each of said stalls being substantially the same length as a cow's body and having a head end and a tail end, the head ends of said stalls facing in the same direction, and a washing stall spanning and extending across the tail ends of said milking stalls and having opposite end portions overlapping said milking stalls and an intermediate portion extending across said work area thereby to form a generally U-shaped structure with said work area within the U, said end portions communicating with said tail ends and being shorter than the length of a cow's body to dispose the udder of a cow standing therein in said intermediate portion adjacent said work area, said washing stall including means to admit a cow with its head at either end thereof.

10. In a milking structure, the combination of, a pair of milking stalls arranged generally parallel to each other and spaced apart to define a work area between them, each of said stalls being substantially the same length as a cow's body and having a head end and a tail end, the head ends of said stalls facing in the same direction, a washing stall spanning and extending across the tail ends of said milking stalls and having opposite end portions overlapping said milking stalls and an intermediate portion extending across said work area thereby to form a generally U-shape structure with said work area within the U, said end portions communicating with said tail ends and the combined length of one of said end portions and said intermediate portion being substantially the length of a cow's body to dispose the udder of a cow adjacent said area and at the closed end of said U irrespective of the direction in which the cow is facing while standing in the washing stall, said washing stall having a first admission opening adjacent one end of said washing stall to permit a cow to enter and stand in the washing stall with its head at the opposite end thereof and a second admission opening adjacent the other end of said washing stall to permit a cow to enter the stall and face in the opposite direction.

11. In a milking structure, the combination of, a pair of milking stalls laterally spaced apart with a work area between them, each of said stalls being substantially the same length as a cow's body, a washing stall spanning adjacent ends of said milking stalls and having opposite end portions overlapping and communicating with said milking stalls and an intermediate portion extending across said work area, one of said end portions and said intermediate portion defining a first space substantially the length of a cow's body and the other end portion and the intermediate portion defining a second and similar space, said washing stall having an opening adjacent the inner end of said first space and a similar opening adjacent the inner end of said second space whereby cows may enter each space through the corresponding openings.

12. In a milking structure, the combination of, a pair of milking stalls laterally spaced apart with a work area between them, each of said stalls being substantially the same length as a cow's body, a washing stall spanning adjacent ends of said milking stalls and having opposite end portions overlapping and communicating with said milking stalls and an intermediate portion extending across said work area, one of said end portions and said intermediate portion defining a first space substantially the length of a cow's body and the other end portion and the intermediate portion defining a second and similar space, said washing stall having an opening adjacent the inner end of said first space and a similar opening adjacent the inner end of said second space, two gates, one closing each of said openings, and means connected to said gates and operable from said work area to open and close the gates.

13. In a milking structure, the combination of, a pair of milking stalls laterally spaced apart with a work area between them, each of said stalls being substantially the same length as a cow's body, and a washing stall spanning adjacent ends of said milking stalls and having opposite end portions overlapping and communicating with said milking stalls and an intermediate portion extending across said work area, one of said end portions and said intermediate portion defining a first space substantially the length of a cow's body and the other end portion and the intermediate portion defining a second and similar space, said washing stall including means to admit a cow to either of said spaces with its head at the corresponding end of the washing stall and having an outwardly opening hole in each end through which holes a cow may project its head while standing in the corresponding one of said spaces.

References Cited in the file of this patent

UNITED STATES PATENTS

| Number | Name | Date |
|---|---|---|
| 1,863,603 | Marshall, Jr. | June 21, 1932 |
| 2,512,094 | Duncan | June 20, 1950 |
| 2,593,597 | Palmer | Apr. 22, 1952 |
| 2,610,608 | Graves | Sept. 16, 1952 |

FOREIGN PATENTS

| Number | Country | Date |
|---|---|---|
| 219,657 | Germany | Mar. 9, 1910 |
| 438,432 | Great Britain | Nov. 18, 1935 |

OTHER REFERENCES

The Surge System of Milking Cows, pages 10, 11 and 20.

Country Gentleman, October 1949, page 60.

Agricultural Engineering, December 1949, page 573.

Country Gentleman, March 1951, page 27.